United States Patent
Lee et al.

(10) Patent No.: US 8,647,771 B2
(45) Date of Patent: Feb. 11, 2014

(54) ELECTRODE-ELECTROLYTE COMPOSITE POWDERS FOR A FUEL CELL AND METHOD FOR THE PREPARATION THEREOF

(75) Inventors: Jong Ho Lee, Seoul (KR); Hae Weon Lee, Seoul (KR); Hue Sup Song, Seoul (KR); Joo Sun Kim, Ilsan (KR); Ji Won Son, Seoul (KR); Hae Ryoung Kim, Seoul (KR); Hwa Young Jung, Incheon (KR)

(73) Assignee: Korea Institute of Science and Technology, Seoul (KR)

( * ) Notice: Subject to any disclaimer, the term of this patent is extended or adjusted under 35 U.S.C. 154(b) by 1475 days.

(21) Appl. No.: 12/167,318

(22) Filed: Jul. 3, 2008

(65) Prior Publication Data

US 2009/0011307 A1 Jan. 8, 2009

(30) Foreign Application Priority Data

Jul. 4, 2007 (KR) ........................ 10-2007-0067286

(51) Int. Cl.
 *H01M 4/58* (2010.01)
 *C01G 39/00* (2006.01)

(52) U.S. Cl.
 USPC .......... 429/224; 429/231.6; 29/2.25; 423/599

(58) Field of Classification Search
 USPC ............... 429/224, 231.6; 423/599; 29/2.25
 See application file for complete search history.

(56) References Cited

U.S. PATENT DOCUMENTS

| | | | |
|---|---|---|---|
| 5,762,900 A * | 6/1998 | Kweon et al. | 423/599 |
| 5,803,934 A | 9/1998 | Carter | |
| 2002/0090553 A1* | 7/2002 | Han et al. | 429/224 |
| 2002/0158233 A1* | 10/2002 | Shoji et al. | 252/500 |
| 2006/0159983 A1 | 7/2006 | Song | |

FOREIGN PATENT DOCUMENTS

| | | |
|---|---|---|
| JP | 1994-089723 A | 3/1994 |
| JP | 1997-502047 A | 2/1997 |
| JP | 2004-335131 A | 11/2004 |
| JP | 2006-040612 A | 2/2006 |
| JP | 2006-351406 A | 12/2006 |

* cited by examiner

*Primary Examiner* — Patrick Ryan
*Assistant Examiner* — Ladan Mohaddes
(74) *Attorney, Agent, or Firm* — Ladas & Parry LLP (57) ABSTRACT

The present invention provides electrode-electrolyte composite particles for a fuel cell, which have either electrode material particles uniformly dispersed around electrolyte material particles or electrolyte material particles uniformly dispersed around electrode material particles, to enhance the electrode performance characteristics and electrode/electrolyte bonding force, as well as thermal, mechanical and electrochemical properties of the fuel cell, in a simple method without using expensive starting materials and a high temperature process.

18 Claims, 10 Drawing Sheets

ELECTRODE-ELECTROLYTE COMPOSITE POWDERS FOR A FUEL CELL AND METHOD FOR THE PREPARATION THEREOF

This application claims the benefit of Korean Patent Application No. 10-2007-0067286, filed on Jul. 4, 2007, in the Korean Intellectual Property Office, the disclosure of which is incorporated herein in its entirety by reference.

FIELD OF THE INVENTION

The present invention relates to electrode-electrolyte composite particles for a fuel cell, which provide good electrode performance characteristics and electrode/electrolyte bonding force, and a method for preparing same.

DESCRIPTION OF THE PRIOR ART

The electrodes of a fuel cell, particularly a solid oxide fuel cell (SOFC), consist of an air electrode (cathode) made of an electron-conductive oxide of perovskite structure, typically $La_{1-x}Sr_xMnO_3$ (x: 0.05~0.85, referred to hereinafter as LSM), and a fuel electrode (anode) made of a transition metal oxide, typically nickel oxide (NiO).

Such electrode materials as LSM and NiO are usually of the form of composite powder obtained by mixing with an electrolyte material such as doped zirconia (e.g., yttria stabilized zirconia (YSZ)) and doped ceria (e.g., gadolium doped ceria (GDC)), respectively, and have improved thermal and mechanical compatibility between the electrodes and the electrolyte. The electrodes made of the composite particles are disposed on one surface of a dense electrolyte made of ion-conductive solid oxides such as YSZ and GDC to construct an SOFC.

The electrochemical reactions in an SOFC comprising electrodes made of the composite particles occur at the interface between the electrodes and electrolyte, as well as within the electrode structure, mostly at the triple phase boundary site where the electrolyte, electrode and pores contact. The effectiveness of the triple phase boundary site is determined by the degree of contact between the electrolyte and electrode, and therefore, it is desirable to increase the triple phase boundary area, e.g., by controlling the microstructures of the composite electrodes among others.

An SOFC comprises a functional layer between each of the electrodes and the electrolyte to improve both the cell performance characteristics and the compatibility between the electrode components. The functional layer must satisfy the required thermal, mechanical and electrochemical properties for the desired redox reactions at the electrodes to take place. For example, the functional layer used in an SOFC single cell must have a thermal expansion coefficient similar to those of other layers of the cell so as to prevent defect formation during cell fabrication or thermal cycling during cell operation, and such functional layer is usually prepared using a composite powder having controlled composition and microstructure.

Typically, SOFC electrodes are prepared using LSM-YSZ composite particles obtained by solid state mixing of YSZ (ion conductor used in electrolyte) and LSM (electrode material) powders. Such solid state mixing of powders stable in the atmosphere provides composite particles having a desired composition, but suffers from the problems of: 1) difficulty of obtaining a fine, uniform composite powder; 2) the inclusion of undesirable impurities during the mechanical mixing; and 3) the low degree of sintering of the mixed powder due to the use of commercially available YSZ powders having a relatively large particle size of 0.2 µm or more. When such mixed powder is used, it becomes difficult to conduct the process of adhering the electrodes on the electrolyte surface at a low temperature, and thus, a sintering step at a high temperature of 1200° C. or higher must be conducted to prepare the cell. However, this high temperature sintering step induces the generation of undesirable products such as resistive $SrZrO_3$ or $La_2Zr_2O_7$ at the electrode/electrolyte interface, which leads to deteriorated electrode performance.

Korean Patent Application Publication No. 2000-0013388 discloses a method for preparing a cathode by coating an LSM powder with a YSZ electrolyte sol, or adding an LSM powder into a YSZ sol to obtain a slurry, and then, coating the surface of the YSZ electrolyte with the slurry, to improve the interfacial performance of the cathode-electrolyte. However, this method has the problem of sol instability in the atmosphere.

A glycine nitrate process (GNP) is reported as a direct and simple method for preparing a high pure ceramic powder for the cathode of SOFC. Korean Patent Application Publication No. 2000-0008664 discloses a modified-glycine nitrate process (M-GNP) which uses stable starting materials employed in the solid mixing method. However, M-GNP has problems in that it is difficult to control the composition and microstructure of the composite powder product, and the reproducibility of the method is poor.

Accordingly, there is a need to develop an improved method for the preparation of composite particles for SOFC.

SUMMARY OF THE INVENTION

It is an object of the present invention to provide electrode-electrolyte composite particles for a fuel cell, which provide good electrode performance characteristics, microstructure and electrode/electrolyte bonding force, thereby enhancing thermal, mechanical and electrochemical properties of the fuel cell, and a simple method for preparing same without using expensive starting materials and a high temperature process.

In accordance with one aspect of the present invention, there is provided a method for preparing electrode-electrolyte composite particles, which comprises:

(1) (A) dissolving a starting material of an electrode material in a solvent to obtain an electrode solution, and adding thereto one material selected from an amino acid, citric acid and a polymer resin, together with a powder form of an electrolyte material which does not dissolve in the electrode solution, or (B) dissolving a starting material of an electrolyte material in a solvent to obtain an electrolyte solution, and adding thereto one material selected from an amino acid, citric acid and a polymer resin, together with a powder form of an electrode material which does not dissolve in the electrolyte solution, to obtain an electrode-electrolyte mixture; and (2) subjecting the electrode-electrolyte mixture to self-combustion or heat treatment.

In accordance with another aspect of the present invention, there are provided electrode-electrolyte composite particles prepared by said method, wherein the composite particles have either the electrode material particles dispersed around the electrolyte material particles, or the electrolyte material particles dispersed around the electrode material particles.

The present invention further provides a fuel cell comprising the electrode-electrolyte composite particles.

BRIEF DESCRIPTION OF THE DRAWINGS

The above and other objects and features of the present invention will become apparent from the following description of the invention taken in conjunction with the accompanying drawings, which respectively show.

DETAILED DESCRIPTION OF THE INVENTION

In general, as the particle size of a ceramic or oxide powder decreases, the surface area of the powder becomes high and the sintering property thereof is improved. Accordingly, composite powders having oxide layers comprising fine particles on the surface thereof, which is prepared by uniformly dispersing coarse electrolyte powders together with a polymer additive in a solution containing a starting material of an electrode material, show improved sintering characteristics during the preparation of electrode, thereby providing an electrode having a good interfacial contact performance between the electrolyte and electrodes and the uniform structure. Also, the increased specific surface area of the electrode material particles can expand the boundary area of triple phase where the electrode, electrolyte and reaction gas are in contact, thereby activating an electrode reaction.

In the present invention, the electrode-electrolyte composite particles are obtained by preparing an electrode solution containing electrode particles of nanometer scale and dispersing electrolyte particles into the electrode solution, followed by self-combustion or heat treatment, to prepare composite particles having electrode particles uniformly formed around the electrolyte particles. The inventive composite can activate an electrochemical reaction and decrease the contact resistance between electrolyte and electrodes, thereby enhancing electrode performance.

FIGS. 1a to 1d schematically show the microstructure of electrode-electrolyte composite particles according to an embodiment of the present invention.

Figure 1A:
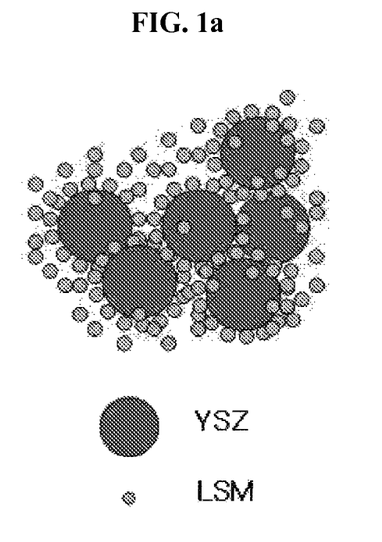
FIGS. 1a to 1d: schematic illustrations showing the microstructure of the electrode-electrolyte composite powders prepared in accordance with the present invention.
Figure 1B:
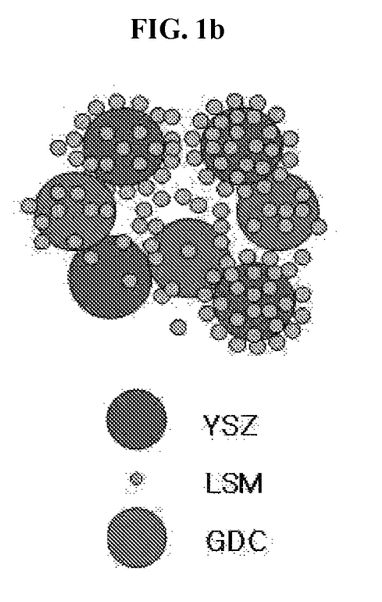
Figure 1C:
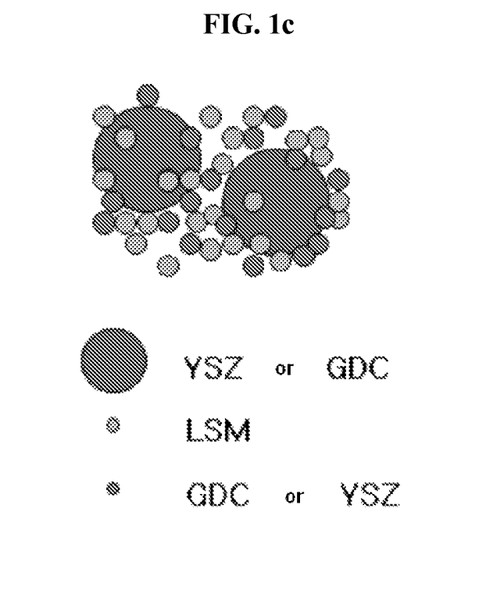

Specifically, FIG. 1a is for composite particles prepared by adding YSZ particles (electrolyte) to a solution of LSM (cathode material) (referred to hereinafter as "LSM-YSZ"); FIG. 1b, composite particles having two different core materials, prepared by adding to the LSM solution YSZ and GDC (Gd doped ceria, $Gd_{0.2}Ce_{0.8}O_2$) particles which have similar particle sizes; FIG. 1c, composite particles having YSZ core materials surrounded with LSM particles and GDC particles having a particle size different from that of YSZ; and FIG. 1d, composite particles having YSZ core materials surrounded with LSM particles and YSZ particles having a particle size different from the YSZ core materials.

Figure 3:
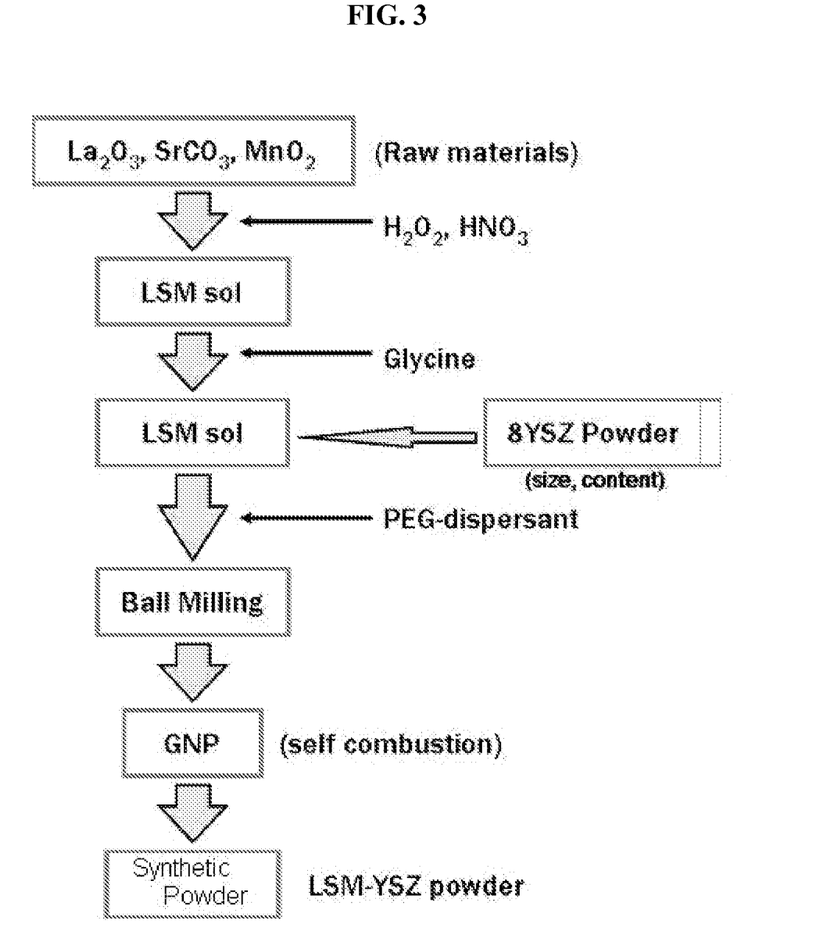
FIG. 3: a flow diagram showing the method for preparing electrode-electrolyte composite particles in accordance with an embodiment of the present invention.

The present invention provides two methods for the preparation of electrode-electrolyte composite particles. One method comprises dissolving a starting material of an electrode material in a solvent to obtain an electrode solution; adding thereto one selected from an amino acid, citric acid and a polymer resin, together with an electrolyte powder which does not dissolve in the electrode solution, to form a uniform mixture; and subjecting the resulting electrode-electrolyte mixture to self-combustion or heat treatment (Method 1). Another method comprises dissolving a starting material of an electrolyte material in a solvent to obtain an electrolyte solution; adding thereto one selected from an amino acid, citric acid and a polymer resin, together with an electrode powder which does not dissolve in the electrolyte solution, to form a uniform mixture; and subjecting the resulting electrode-electrolyte mixture to self-combustion or heat treatment (Method 2). FIG. 3 schematically shows a procedure for preparing electrode-electrolyte composite particles in accordance with an embodiment of the present invention.

Hereinafter, said Methods 1 and 2 according to the present invention and electrode-electrolyte composite particles prepared thereby will be explained in detail.

<Method 1>

Referring to the electrode solution according to the present invention, the solvent for obtaining the electrode solution is suitable to dissolve the starting material of an electrode material and generate an ion which can be used as an oxidant during the self-combustion procedure. The preferred example of the solvent is nitric acid-containing solvents, e.g., nitric acid or a mixture of nitric acid and water, which generate nitrate ion ($NO_3$—). The nitrate ion can be used as an oxidant by the addition of amino acid in the self-combustion step.

The starting material of an electrode material used in the present invention means a raw material such as $La_2O_3$, $SrCO_3$ and $MnO_2$, and it is distinguished from "an electrode material" (e.g., LSM powder) which does not dissolve in the solvent. The examples of the starting material of the electrode material include an oxide, a carbide, a metal, and a mixture thereof which are stable in the atmosphere and soluble in nitric acid. The electrode solution may further comprise a water-soluble metal salt or hydrogen peroxide to enhance the solubility of the starting material.

To such an electrode solution, one selected from an amino acid, citric acid and a polymer resin, together with an electrolyte powder which does not dissolve in the electrode solution are added to obtain an electrode-electrolyte mixture.

Preferably, the electrode-electrolyte mixture further comprises a polymer dispersing agent to uniformly disperse the electrolyte powders. The polymer dispersing agent is suitably used in an amount of 0.1 to 4 wt % based on the weight of the electrolyte material, and its amount is preferably determined in proportion to the size and weight of the electrolyte material. Further, it is desirable that the electrode-electrolyte mixture is treated with a ball mill for complete dispersion.

The electrolyte material used in the present invention preferably has a particle size of 10 nm to 5 μm, and it is added in an amount of 10 to 80 vol % based on the electrode-electrolyte composite particles.

Such an electrolyte material may be an ion-conductive oxide, or a mixed conductive oxide having both of ionic and electronic conductivities. The examples of the electrolyte material include, but are not limited to, (Sc, Y)-doped zirconia, (Gd, Sm, Y, La)-doped ceria, perovskite-based oxide or modified perovskite-based oxide having ion conductivity and mixed conductivity, $BaCeO_3$, $SrCeO_3$, $BaZrO_3$, $LaBaGaO_4$, $Ba_3Ca_{1-x}Nb_{2-x}O_9$ (0≤x≤0.05), and a mixture thereof. The electrolyte material may be same or different kinds and sizes.

The amino acid used in the present invention is suitably glycine, but other amino acids may be used. Glycine is preferably used so that the molar ratio of the nitrate ion generated in the solvent used and glycine is 1:0.5 to 1:4, preferably 1:0.55 to 1:0.7, for the effective combustion. Also, it is preferred that the molar ratio of the cation of the starting material of the electrode material and glycine is 1:0.1 to 1:3. The electrode solution preferably exhibits a pH in the range of 1 to 5.

The polymer resin used in the present invention is preferably one having epoxy, acryl, vinyl or amino groups.

Then, the electrode-electrolyte mixture is heated at a temperature ranging from 200 to 400° C. to induce self-combustion (200 to 300° C.) or heat treatment (200 to 400° C.), thereby producing electrode-electrolyte composite particles. According to the temperature of heat treatment, the particle size of the composite particles can be controlled.

The electrode-electrolyte composite particles may be further calcined at a temperature of 1000° C. or lower. The calcining temperature can control the microstructure of composite particles.

The inventive electrode-electrolyte composite particles obtained above has a structure having the particulate electrode material uniformly dispersed surrounding the electrolyte material particles. Preferably, the electrolyte material and the electrode material have a size ratio of 1:0.01 to 1:100.

Figure 2A:
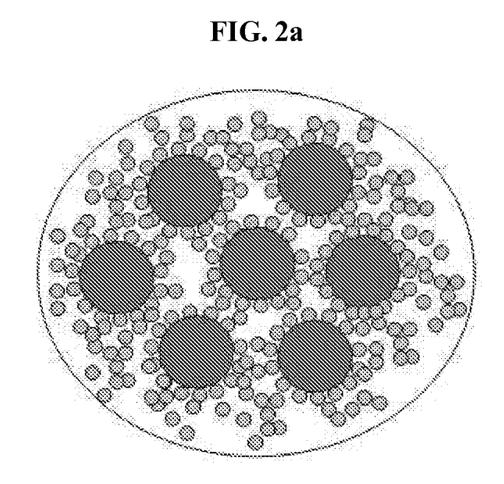
FIGS. 2a to 2c: schematic illustrations showing the structures of the electrode-electrolyte composite powders aggregated in an electrode solution.
Figure 2B:
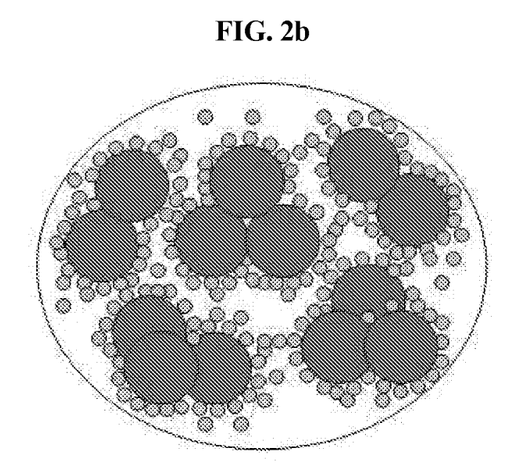
Figure 2C:
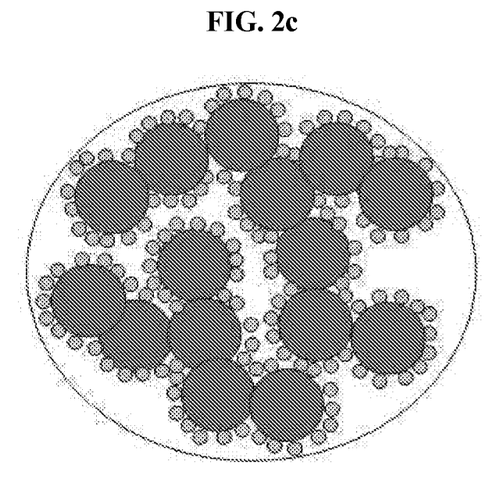

In accordance with the present invention, it is possible to control the size, composition, content and dispersion degree of the electrolyte material added to the electrode solution to obtain various aggregate structures of electrode-electrolyte composite particles, as shown in FIGS. 2a to 2c.

FIG. 2a shows an aggregate structure wherein the electrolyte particles are completely uniformly dispersed, with being apart from each other, in a small volume fraction relative to the electrode material, and each of the particles is surrounded by individual electrode material particles to connect the electrode material with each other, thereby enhancing electron-conductivity and maximizing the boundary area of triple phase.

FIG. 2b shows an aggregate structure wherein the electrolyte particles are partially uniformly dispersed as aggregates of 2 to 3 particles, in a middle volume fraction relative to the electrode material, and the aggregates are partially or wholly surrounded by the electrode material to generate a pore structure therein, which can also form a sufficient boundary area of triple phase.

FIG. 2c shows an aggregate structure wherein the electrolyte particles are connected to each other as aggregates of a chain form, in a large volume fraction relative to the electrode material, and the aggregates are partially or wholly surrounded by the electrode material to increase the amount of the electrolyte particles, thereby enhancing the interfacial contact performance between the electrolyte and electrodes, with forming a sufficient boundary area of triple phase.

Figure 1D:
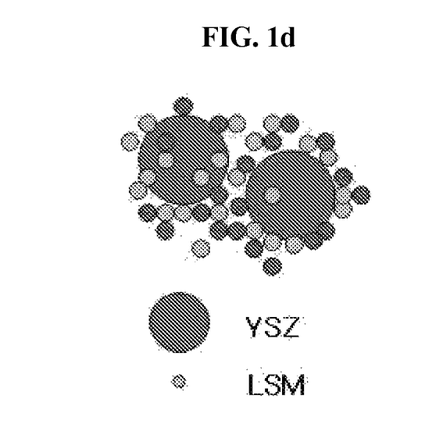

While FIGS. 2a to 2c show structures using the electrolyte particles having the same kinds and sizes, different kinds and sizes of electrolyte particles, as shown in FIGS. 1b and 1d, may also be applied in the present invention.

<Method 2>

The solvent for obtaining an electrolyte solution is the same as used in Method 1 above.

The starting material of an electrolyte material used in the present invention means a raw material such as $GdO_2$ and $CeO_2$ and preferably dissolves in the nitric acid-containing solvent, and it is distinguished from "an electrolyte material" (e.g., GDC particles) which does not dissolve in the solvent. The examples of the starting material of the electrolyte material include an oxide, a carbide, a metal, and a mixture thereof which are stable in the atmosphere and soluble in nitric acid. The electrolyte solution may further comprise a water-soluble metal salt.

To such electrolyte solution, one selected from an amino acid, citric acid and a polymer resin, together with electrode particles which do not dissolve in the electrolyte solution are added to obtain an electrode-electrolyte mixture.

Preferably, the electrode-electrolyte mixture further comprises a polymer dispersing agent to uniformly dispersing the electrode powders. The polymer dispersing agent is suitably used in an amount of 0.1 to 4 wt % based on the weight of the electrode material.

The electrode material used in the present invention may be conventional materials for cathode or anode. The cathode material may be a conductive oxide which has catalytic activity for oxygen reduction, and ionic and electronic conductivities. The anode material may be a metal or an oxide which has catalytic activity for fuel gas and electronic conductivity.

The amino acid and the polymer resin are the same as used in Method 1 above. The electrolyte solution preferably exhibits a pH in the range of 4 to 6.

Then, the electrode-electrolyte mixture is subjected to self-combustion or heat treatment, and, if necessary, further calcinations with the same manner as Method 1 above.

The inventive electrode-electrolyte composite particles obtained above have a structure having the electrolyte material particles uniformly dispersed surrounding the electrode material particles. Preferably, the electrolyte material and electrode material have the size ratio of 1:0.01 to 1:100.

Thus, in accordance with the present invention, electrode-electrolyte composite particles having a high purity can be directly prepared from a solution containing the electrode or electrolyte particles dispersed uniformly, with controlling the desired chemical composition thereof. Particularly, the uniform dispersion of the electrode or electrolyte particles in the electrode or electrolyte solution can be maintained after the formation of the composite particles. Also, the inventive method may be continuously conducted to achieve the mass production of the composite particles.

The electrode-electrolyte composite particles of the present invention can be used in a functional layer or an electrode of a fuel cell, particularly SOFC to enhance thermal, mechanical and electrochemical properties of the cell.

The present invention will be described in further detail with reference to Examples. However, it should be understood that the present invention is not restricted by the specific Examples.

EXAMPLE 1

108.34 g of $La_2O_3$, 42.08 g of $SrCO_3$ and 81.82 g of $MnO_2$, starting materials of an electrode material, were dissolved in a mixture of 500 ml of nitric acid and 200 ml of hydrogen peroxide, to which 370 g of glycine was added such that the equivalent ratio of glycine/cation of the starting materials of the electrode material is 2.5, to obtain a 1 M electrode solution having pH 1.5.

To 309.25 g (containing 30 g of the starting materials of the electrode material) of the electrode solution, 32.42 g of a YSZ powder having an average particle size of 0.2 μm was added such that the ratio of LSM:YSZ is 50:50 vol %, together with 0.65 g (2 wt % based on the weight of the YSZ powder) of polyethylene glycol (PEG) having an average molecular weight of 20,000±5,000 g/mol as a dispersing agent. The resulting mixture was ball-milled for about 12 hours and placed in a reactor. The reactor was then heated on a hot plate (250° C.) for water evaporation and self combustion, to obtain LSM-YSZ composite particles of crystalline form. The composite particles thus obtained were calcined at 900° C. or lower. The LSM-YSZ composite powder product was analyzed with an inductively coupled plasma mass spectrometer (ICP) to determine the composition and cation concentrations, which were compared with those intended. The results are shown in Table 1. The differences between the intended and calculated values are within the error range of the measurement.

TABLE 1

|    | Intended composition | | Calculated composition | |
|----|---------|----------|---------|----------|
| La | 0.665   | 50.0 vol % | 0.67  | 50.5 vol % |
| Sr | 0.285   |          | 0.28    |          |
| Mn | 1       |          | 1       |          |
| Y  | 0.16    | 50.0 vol % | 0.16  | 49.5 vol % |
| Zr | 0.84    |          | 0.84    |          |

As can be seen from Table 1, the measured composition of the composite powder product is very close to that expected.

Figure 4A:
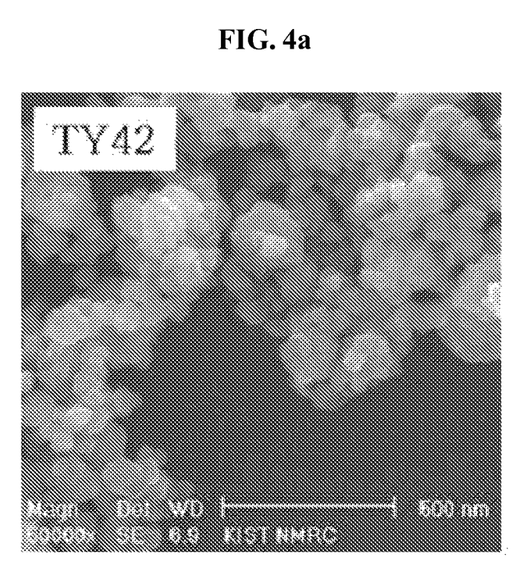
FIGS. 4a and 4b: scanning electron microscope images of the electrode-electrolyte composite particles prepared in accordance with the present invention.
Figure 4B:
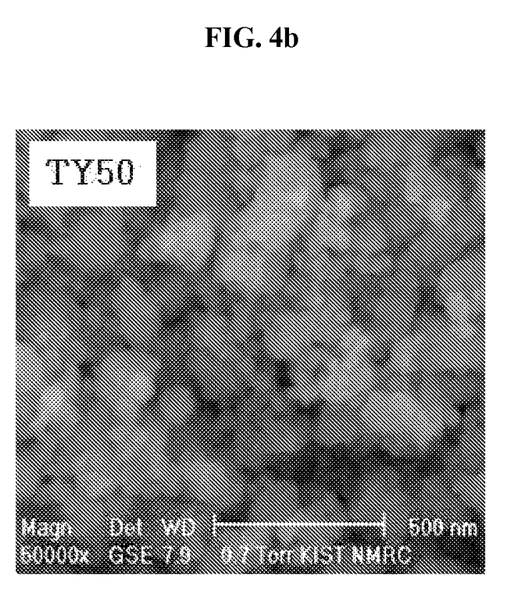

Meanwhile, the LSM-YSZ composite particles obtained were analyzed for their microstructures with a scanning electron microscope, and the results for the composite particles having the LSM-YSZ ratio of 58:42 (TY42) and 50:50 (TY50) are shown in FIGS. 4a and 4b. As can be seen from FIGS. 4a and 4b, many LSM particles having several tens of nm size were formed around the YSZ particles.

Figure 5:
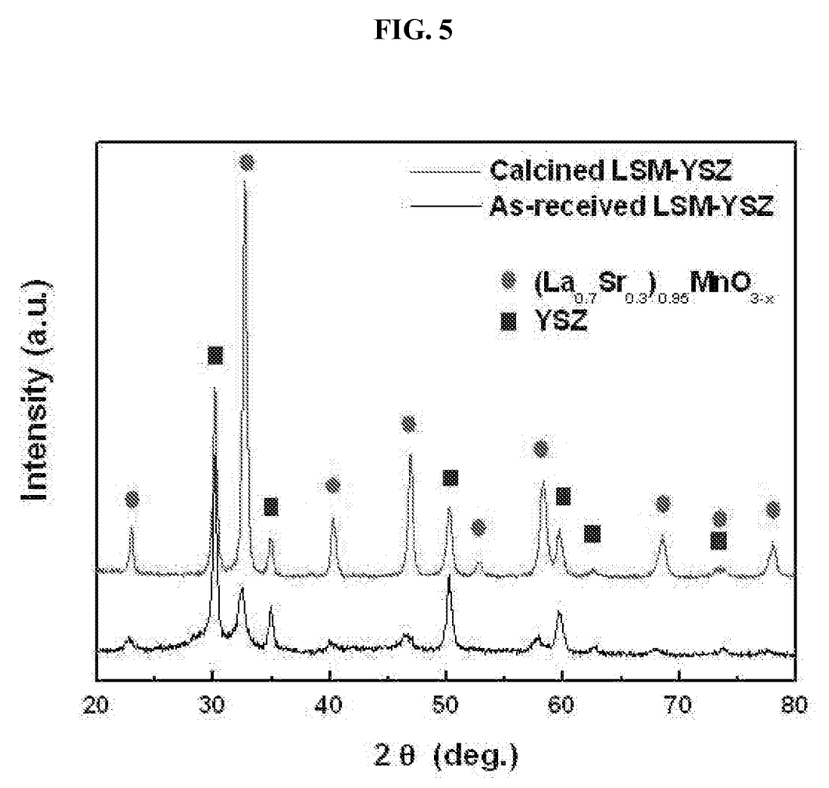
FIG. 5: an X-ray diffraction spectrum of the LSM-YSZ composite particles prepared in Example 1 of the present invention.

Also, the LSM-YSZ composite particles as received by self combustion and those calcined at 800° C. were analyzed by an XRD method and the results are shown in FIG. 5. As can be seen from FIG. 5, both of the composite particles as received and calcined have crystalline forms and no side product. That is, the LSM-YSZ composite particles were completely formed.

EXAMPLE 2

The electrode solution obtained in Example 1 was used while varying the size of the YSZ powder, to obtain LSM-YSZ composite particles. Specifically, two samples of 309.25 g of the electrode solution obtained in Example 1 were independently put in separate containers, to which 32.42 g of a YSZ powder having an average particle size of 20 nm and 32.42 g of a YSZ powder having an average particle size of 2 μm were added, respectively. To each of two containers, PEG was added in an amount of 3 wt % and 1 wt % based on the weight of the YSZ powder, respectively. Each resulting solution was ball-milled and placed in each reactor, followed by self combustion, to obtain LSM-YSZ composite particles having the LSM-YSZ ratio of 50:50 vol %. The composite particles were calcined at a temperature of 900° C. or lower, to obtain the composite particles of crystalline form.

EXAMPLE 3

The electrode solution obtained in Example 1 was used while varying the size and amount of the YSZ powder by using the procedure as described in Example 2, to obtain LSM-YSZ composite particles having a LSM-YSZ ratio of 90:10, 80:20, 65:35, 58:42, 50:50 and 20:80 vol %.

Specifically, six samples of the electrode solution obtained in Example 1 were weighted to satisfy said LSM-YSZ ratios, respectively, and independently put in each container. Thereto, each sample of the YSZ powder weighted to satisfy said LSM-YSZ ratios was added, the YSZ powder having an average particle size of 0.02 μm. To each container, PEG was added in an amount of 0.5 to 4.0 wt % based on the weight of the YSZ powder. Each resulting solution was ball-milled and placed in each reactor, followed by self combustion, to obtain LSM-YSZ composite particles having said LSM-YSZ ratios. The composite particles were calcined at a temperature of 900° C. or lower, to obtain the composite particles of crystalline form.

Similarly, each of the YSZ powders having an average particle size of 0.2 and 2 μm was used to obtain LSM-YSZ composite particles having said LSM-YSZ ratios, followed by said calcination step.

Figure 6:
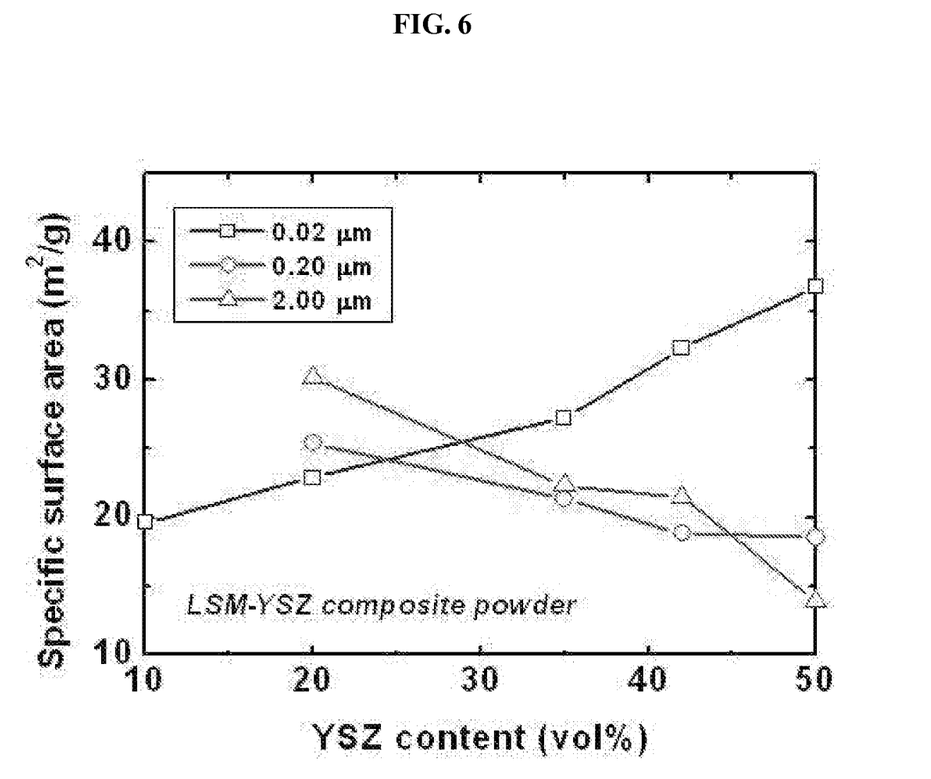
FIG. 6: a graph showing specific surface areas vs. the size and content of YSZ particles in the LSM-YSZ composite particles prepared in Example 3 of the present invention.

FIG. 6 shows specific surface areas of the LSM-YSZ composite particles prepared by varying the size and content of the YSZ powder, wherein the specific surface area of the composite particles using the YSZ powder of 0.02 μm increases in proportion to the content of the YSZ powder, while the specific surface area of those using the YSZ powders of 2 μm increases in inverse proportion to the content of the YSZ powder. Also, the composite particles having the LSM-YSZ ratio of 50:50 have the specific surface area increasing as the size of the YSZ powder decreases, while those having the LSM-YSZ ratio of 80:20 have the specific surface area increasing as the size of YSZ powder increases.

EXAMPLE 4

The electrode solution obtained in Example 1 was used while varying the size of the YSZ powder and setting the amount thereof, to obtain LSM-YSZ composite particles.

Specifically, to three samples of the electrode solution obtained in Example 1 in an amount of 58 vol % based on the final composite particles, each mixture of a YSZ powder of 0.02 μm size and a YSZ powder of 2 μm size having a mix ratio of 25:75, 50:50 and 75:25% was added in an amount of 42 vol % based on the final composite powders, respectively. To each solution, PEG was added and dispersed in an amount of 1, 2 and 3 wt %, respectively, based on the weight of the YSZ powder, followed by self combustion, to obtain LSM-YSZ composite particles having the LSM-YSZ ratio of 58:42 vol %. The composite particles were calcined at a temperature of 800° C. or lower, to obtain the composite particles of crystalline form.

The composite particles obtained above were measured for their physical properties and the results are shown in Table 2.

TABLE 2

| YSZ size ratio 2.0:0.02 μm | Volume contraction (%) | Weight loss (%) | Sinterability | Open porosity (%) | Sintered density (%) |
|---|---|---|---|---|---|
| 75:25 | 51.50 | 4.47 | 77.42 | 10.09 | 87.93 |
| 50:50 | 52.93 | 4.84 | 80.58 | 8.00 | 89.36 |
| 25:75 | 54.85 | 4.80 | 86.04 | 3.88 | 92.44 |

Figure 7:
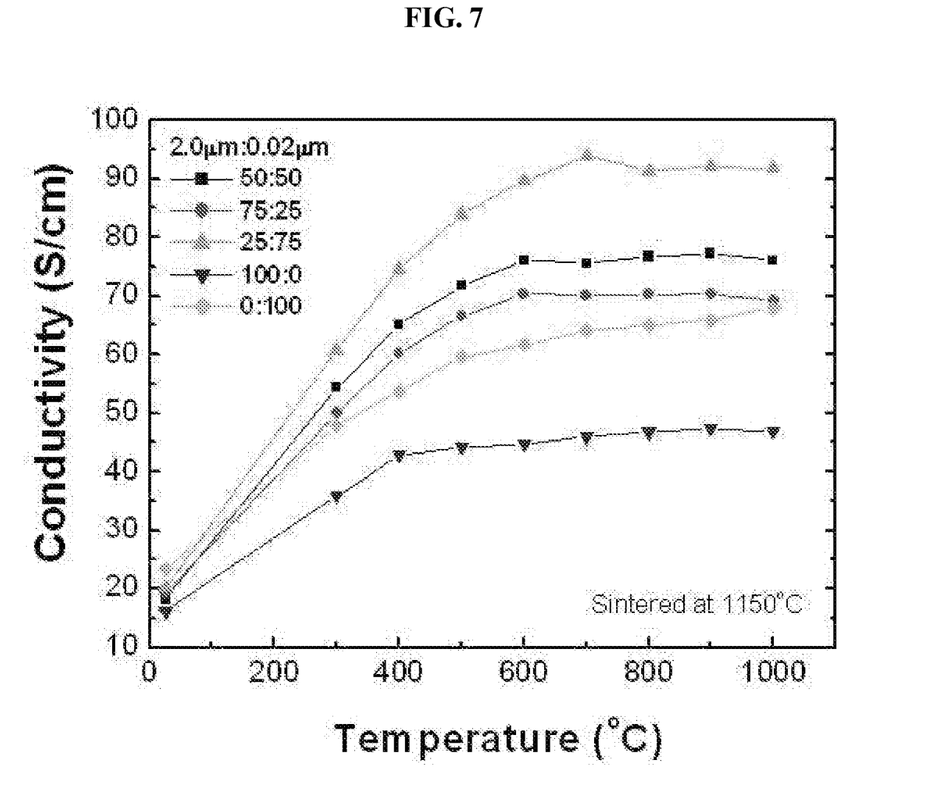
FIG. 7: a graph showing conductivity changes depending on the mix ratio of YSZ particles having different sizes in the LSM-YSZ composite particles prepared in Example 4 of the present invention.

Meanwhile, FIG. 7 shows the conductivity of the LSM-YSZ composite particles obtained above. As can be seen from FIG. 7, the composite particles prepared from the mixture of the YSZ powder of 2 μm and that of 0.02 μm having the mix ratio of 25:75% have the highest conductivity compared with other cases.

EXAMPLE 5

The solution of Ni used as a fuel electrode material was prepared by the procedure as described in Example 1. To the solution, GDC or YSZ powders used as an electrolyte material were added and dispersed, together with a dispersing agent, followed by self combustion, to obtain NiO-GDC or NiO-YSZ composite particles. The NiO-GDC composite particles have a NiO-GDC ratio of 56:44 wt %. The composite particles were further calcined at a temperature of 850° C. or lower.

Figure 8:
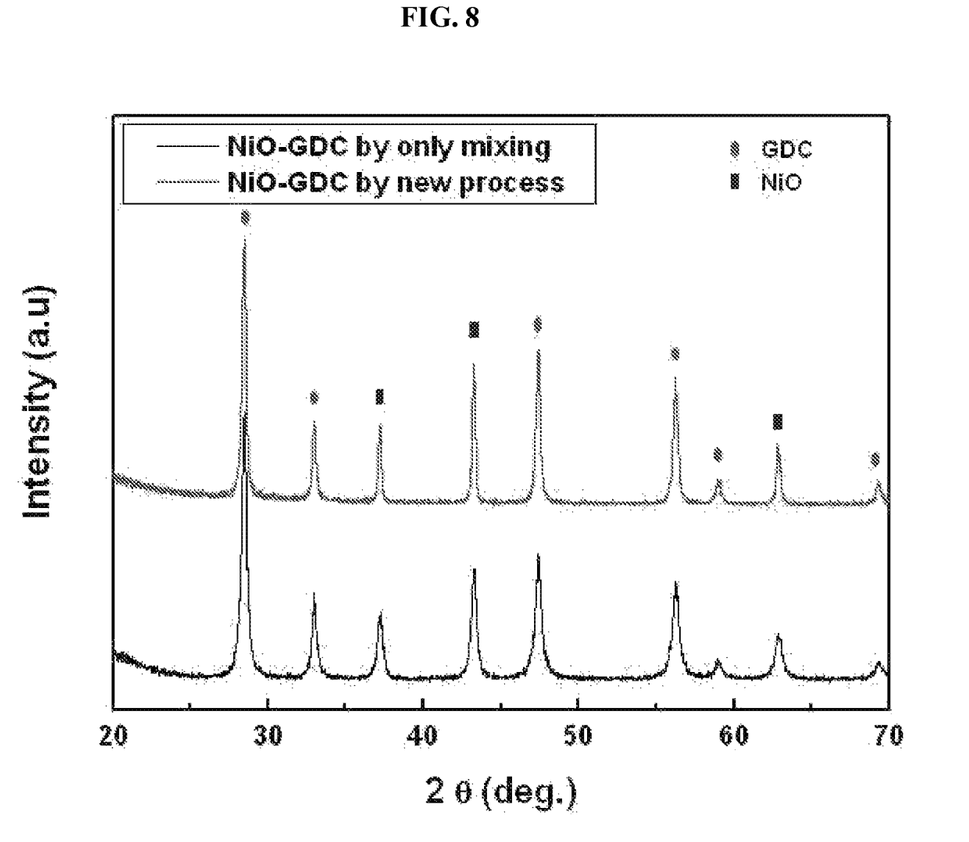
FIG. 8: an X-ray diffraction spectrum of the NiO-GDC composite particles prepared in Example 5 of the present invention.

The calcined NiO-GDC composite particles were analyzed by an XRD method and the results are shown in FIG. 8, from which the NiO-GDC composite particles can be seen to have crystalline form.

EXAMPLE 6

The solution of GDC used as an electrolyte material was used and NiO and LSM of an electrode material were dispersed therein, to obtain NiO-GDC or LSM-GDC composite particles having an electrode material core.

Specifically, $GdO_2$ and $CeO_2$ having high purity in an amount of 10 mol % and 90 mol %, respectively, were dissolved in a mixture of nitric acid and water, to which glycine was added so that the molar ratio of glycine/cation is the same as described in Example 1, to obtain a 1 M GDC solution having pH of 4 to 5. The pH value was adjusted by controlling the amount of water added.

To the GDC solution, NiO or LSM powders having an average particle size of 0.8 μm and a dispersing agent were added, followed by self combustion, to obtain NiO-GDC or LSM-GDC composite particles wherein the NiO:GDC and LSM:GDC ratios were 56:44 wt % and 50:50 wt %, respectively. The composite particles obtained were calcined at a temperature of 850° C. or lower. The calcined NiO-GDC composite particles were analyzed by an XRD method. The results are the same as those of FIG. 8. That is, the NiO-GDC composite particles have crystalline form.

While the invention has been described with respect to the specific embodiments and the drawings appended herein, it should be recognized that various modifications and changes may be made by those skilled in the art to the invention which also fall within the scope of the invention as defined as the appended claims.

What is claimed is:

1. A method for preparing electrode-electrolyte composite particles, which comprises,
   (1) dissolving a starting material of an electrode raw material in a solvent to obtain an electrode solution, wherein the electrode raw material is selected from the group consisting of lanthanum raw material, strontium raw material, manganese raw material, nickel raw material, and combinations thereof, and adding thereto one material selected from an amino acid, citric acid and a polymer resin, together with a powder form of an electrolyte material which does not dissolve in the electrode solution to obtain an electrode-electrolyte mixture, the solvent comprising water and nitric acid;
   (2) ball-milling the electrode-electrolyte mixture;
   (3) subjecting the ball-milled mixture to self-combustion or heat treatment, to form composite particles in crystalline form; and
   (4) calcining the composite particles to form the electrode-electrolyte composite particles, wherein the electrode-electrolyte composite particles comprise $La_{1-x}Sr_x MnO_3$ wherein $0.05 \leq x \leq 0.85$.

2. The method for preparing electrode-electrolyte composite particles of claim 1, wherein the electrode raw material is selected from the group consisting of $La_2O_3$, $SrCO_3$, $MnO_2$, NiO, and mixtures thereof.

3. The method for preparing electrode-electrolyte composite particles of claim 1, wherein the electrolyte material is selected from the group consisting of yttria stabilized zirconia (YSZ), scandium doped zirconia, gadolium doped ceria (GDC), samarium doped ceria, yttria doped ceria, lanthanum doped ceria, $BaCeO_3$, $SrCeO_3$, $BaZrO_3$, $LaBaGaO_4$, and $Ba_3Ca_{1-x}Nb_{2-x}O_9$ such that $0 \leq x \leq 0.05$.

4. The method for preparing electrode-electrolyte composite particles of claim 1, wherein the electrode-electrolyte composite particles comprise NiO.

5. The method for preparing electrode-electrolyte composite particles of claim 1, wherein calcining the composite particles to form composite particles in crystalline form is conducted at a temperature up to 1000° C.

6. The method for preparing electrode-electrolyte composite particles of claim 1, wherein the amino acid is glycine.

7. The method for preparing electrode-electrolyte composite particles of claim 6, wherein the subjecting the ball-milled mixture to heat treatment, to form composite particles in crystalline form, is conducted at a temperature ranging from 200° C. to 400° C.

8. The method for preparing electrode-electrolyte composite particles of claim 1, wherein ball-milling the electrode-electrolyte mixture comprises using a polyethylene glycol (PEG) dispersing agent having an average molecular weight of about 20,000 ±5,000 g/mol.

9. The method for preparing electrode-electrolyte composite particles of claim 1, wherein the polymer resin has epoxy, acryl, vinyl or amino groups.

10. The method for preparing electrode-electrolyte composite particles of claim 1, wherein the solvent further comprises hydrogen peroxide.

11. The method for preparing electrode-electrolyte composite particles of claim 1, wherein the starting material of the electrode raw material is added into the solvent before adding an electrolyte material.

12. Electrode-electrolyte composite particles prepared by the method according to claim 1, the composite particles having either electrode material particles dispersed around electrolyte material particles, or electrolyte material particles dispersed around electrode material particles.

13. The electrode-electrolyte composite particles of claim 12, wherein the electrolyte material particles are uniformly dispersed, with being apart from each other, and the electrode material particles surround the electrolyte material particles.

14. The electrode-electrolyte composite particles of claim 12, wherein the electrolyte material particles are partially uniformly dispersed as aggregates, and the electrode material particles partially or wholly surround the electrolyte material particles.

15. The electrode-electrolyte composite particles of claim 12, wherein the electrolyte material particles are connected to each other as the aggregates of a chain form, and the electrode material particles partially or wholly surround the electrolyte material particles.

16. The electrode-electrolyte composite particles of claim 12, wherein the electrolyte material and the electrode raw material have a size ratio of 1:0.01 to 1:100.

17. The electrode-electrolyte composite particles of claim 12, wherein the electrolyte material is present in an amount of 10 to 80 vol % based on the electrode-electrolyte composite particles.

18. A fuel cell comprising the electrode-electrolyte composite particles of claim 12.

* * * * *